(12) United States Patent
Oh et al.

(10) Patent No.: US 8,006,084 B2
(45) Date of Patent: Aug. 23, 2011

(54) APPARATUS AND METHOD FOR MANAGING PLURALITY OF CERTIFICATES

(75) Inventors: Yun-sang Oh, Seoul (KR); Sang-gyoo Sim, Suwon-si (KR); Suk-bong Lee, Suwon-si (KR); Kyung-im Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 806 days.

(21) Appl. No.: 11/600,766

(22) Filed: Nov. 17, 2006

(65) Prior Publication Data

US 2007/0136574 A1 Jun. 14, 2007

(30) Foreign Application Priority Data

Dec. 9, 2005 (KR) ........................ 10-2005-0120904

(51) Int. Cl.
*H04L 29/06* (2006.01)
*G06F 21/00* (2006.01)

(52) U.S. Cl. ...................................................... 713/156
(58) Field of Classification Search ................... 713/156
See application file for complete search history.

(56) References Cited

U.S. PATENT DOCUMENTS

| 2002/0078347 | A1* | 6/2002 | Hericourt et al. ............. 713/156 |
| 2003/0014629 | A1  | 1/2003 | Zuccherato |
| 2004/0253943 | A1* | 12/2004 | Suzuki et al. ................. 455/411 |
| 2005/0160041 | A1  | 7/2005 | Griffin et al. |
| 2006/0168447 | A1* | 7/2006 | Pailles et al. .................. 713/176 |

FOREIGN PATENT DOCUMENTS

| EP | 0782296 A2 | 7/1997 |
| JP | 2000-196583 A | 7/2000 |
| JP | 2002-99647 A | 4/2002 |
| JP | 2002-202954 A | 7/2002 |
| JP | 2004-40772 A | 2/2004 |
| JP | 2004-48749 A | 2/2004 |
| JP | 2004-153711 A | 5/2004 |
| JP | 2004-214751 A | 7/2004 |
| JP | 2004-259176 A | 9/2004 |
| JP | 2004-264890 A | 9/2004 |
| JP | 2005-6076 A | 1/2005 |
| JP | 2005-6184 A | 1/2005 |
| JP | 2005-11084 A | 1/2005 |
| WO | 03/105399 A1 | 12/2003 |

OTHER PUBLICATIONS

Office Action issued on Apr. 6, 2010 in counterpart Japanese Application No. 2006-318589.
Communication issued Jan. 25, 2011 by Japanese Office Action in counterpart Japanese Patent Application No. 2006-318589.
Hiromiki, A. M. "The latest network technology", 9th edition. IEEE802.1x., Nikkei byte, No. 232., Nikkei Business Publications Inc. 2002, pp. 116-121.

* cited by examiner

*Primary Examiner* — Gilberto Barron, Jr.
*Assistant Examiner* — Cordelia Zecher
(74) *Attorney, Agent, or Firm* — Sughrue Mion, PLLC

(57) ABSTRACT

An apparatus and method for managing a plurality of certificates are provided. The apparatus for managing a plurality of certificates includes a plurality of certificates, a certificate search table, a low-performance file system, and a verification module. The certificate search table includes information about the plurality of certificates. The low-performance file system extracts a corresponding certificate from among the plurality of certificates that are received from a host device, with reference to the certificate search table based on a root certificate authority ID and information about a public key of a certificate of a certificate authority that issued the host device certificate. The verification module uses the extracted certificate to verify the host device certificate.

16 Claims, 8 Drawing Sheets

FIG. 5

| CERTIFICATE TYPE | ROOT CERTIFICATE AUTHORITY ID | HASH OF PUBLIC KEY | LOCATION AND LENGTH OF CERTIFICATE |
|---|---|---|---|
| FINAL CERTIFICATE | CMLA(OMA) | 448EBA4·· | ··· |
| CERTIFICATE OF ROOT CERTIFICATE AUTHORITY | CMLA(OMA) | F58C910·· | ··· |
| ··· | ··· | ··· | ··· |
| CERTIFICATE OF ROOT CERTIFICATE AUTHORITY | MS | 918FFBA·· | ··· |
| FINAL CERTIFICATE | MS | 12CDBE78·· | ··· |

APPARATUS AND METHOD FOR MANAGING PLURALITY OF CERTIFICATES

CROSS-REFERENCE TO RELATED APPLICATION

This application claims priority from Korean Patent Application No. 10-2005-0120904 filed on Dec. 9, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to management of certificates and, more particularly, to managing a plurality of certificates in a low-performance device.

2. Description of the Related Art

In general, the implementation of a security function between devices starts with the issuance and verification of a certificate. Most recent devices, such as a wireless phone, a personal computer, a Moving Picture Experts Group (MPEG) Audio Layer-3 (MP3) player, and a security memory storage device, use certificates. The devices exchange the certificates and verify whether the certificates are valid before any further communication with the other devices takes place.

In this case, the certificates the validity of which is verified are limited to certificates issued by the same root certificate authority. The reason for this is that it is meaningless to verify the validity between certificates issued by different root certificate authorities.

In general, in order to verify the validity of a certificate, it is required that the certificate have the electronic signature of the root certificate authority. In this case, a certificate path may exist between the certificate of a root certificate authority and a device certificate (a final certificate). The certificate path begins at the certificate of the root certificate authority and ends with the final certificate. It is assumed that the certificate of the root certificate authority is valid.

FIG. 1 is a diagram illustrating a related art certificate path.

Referring to FIG. 1, the certificate of a root certificate authority signs the certificate content of a lower certificate authority using its private key, and issues the certificate of the lower certificate authority. The lower certificate authority may issue the certificate of its lower certificate authority in the same manner. A final certificate authority on an issuance path issues a final certificate.

In more detail, the certificate content (or certificate content and a public key A) of a root certificate authority A is electronically signed using the private key of the root certificate authority A, which is paired with the public key A of the root certificate authority A. The certificate of the root certificate authority A is issued with a signed result added thereto.

Thereafter, the certificate content (or certificate content and a public key B) of a lower certificate authority B is electronically signed using the private key of the root certificate authority A. The certificate of the lower certificate authority B is issued with a signed result added thereto. In this case, the public key A may be included in the certificate of the lower certificate authority B.

The certificate content (or certificate content and a public key C) of a lower certificate authority C is electronically signed using the private key of the lower certificate authority B. The certificate of the lower certificate authority C is issued with a signing result added thereto. The public key B may be included in the certificate of the lower certificate authority C.

The electronic signing is repeated in this manner until the issuance of the final certificate. In this case, the public key of an upper certificate authority may be included in the final certificate.

In general, a device has the final certificate based on a certificate path such as its device certificate. The verification of the final certificate between devices is performed as follows.

First, the final certificate is verified using the public key C of the certificate of the certificate authority C that issued the final certificate. The certificate of the certificate authority C, which verifies the final certificate, is also verified using the public key B of the certificate of the upper certificate authority B that issued it. In the same manner, the certificate of the certificate authority B, which issued the certificate of the certificate authority C, is verified using the public key A of the certificate of the root certificate authority A, which issued the certificate of the certificate authority B. In this manner, the final certificate of the device is verified using the certificate of the root certificate authority A.

Recently, the requirement for one device to have a plurality of certificates issued by a plurality of root certificate authorities has arisen. One example of such a device is a personal computer having both Open Mobile Alliance DRM (OMA DRM) and Microsoft DRM.

The OMA DRM and Microsoft DRM operate root certificate authorities independent of each other. As a result, the personal computer must have both a certificate issued by a certificate authority for the OMA DRM and a certificate issued by a certificate authority for Microsoft DRM. In this case, a structure for performing verification in the personal computer is shown in FIG. 2.

Referring to FIG. 2, a personal computer 200 includes a verification module 210, a high performance file system 220, and a plurality of certificates 230.

The personal computer 200 has the plurality of certificates 230 issued by a plurality of certificate authorities. In this case, the personal computer 200 has a high performance file system 220 that can operate independently, therefore a write operation and a read operation can be conveniently conducted regardless of the number of certificates.

The certificate write operation of the personal computer 200 can be performed according to the following procedure.

Operation 1) The verification module 210 transfers a certificate to be written to the high performance file system 220, along with a file name, in which information about the identification of an issuance authority is used.

Operation 2) The high performance file system 220 stores the corresponding certificate in a storage area using the received file name.

Furthermore, the certificate read operation of the personal computer 200 can be performed according to the following procedure.

Operation 1) The verification module 210 transfers the file name of a certificate to read to the high performance file system 220 using information about the identification of an issuance authority.

Operation 2) The high performance file system 220 reads a certificate stored using the received file name.

Operation 3) The high performance file system 220 transfers the read certificate to the verification module 210.

FIG. 3 illustrates the construction of a low-performance device 320, rather than a high performance device such as the personal computer 200 shown in FIG. 2. The low-performance device 320, such as a memory card, has a low-performance file system 327 that can be operated only by a host device 310. The conventional low-performance device 320 generally has only a single certificate issued by a single certificate authority.

A certificate read operation in the low-performance device 320 may be performed according to the following procedure.

Operation 1) The verification module 315 of the host device 310 requests the low-performance device 320 to read the certificate of the low-performance device 320.

Operation 2) The verification module 325 of the low-performance device 320 requests the low-performance file system 327 to read the certificate.

Operation 3) The low-performance file system 327 of the low-performance device 320 directly accesses the memory address in which a certificate 329 is stored and reads the certificate.

At the time of accessing the certificate in the above-described procedure, the requirements for the certificate issuance authority are not included.

According to the above-described prior art, a device having a plurality of certificates issued by a plurality of certificate authorities must be implemented as shown in FIG. 2. Implementing the operation in the low-performance device shown in FIG. 3 increases the resource consumption of the low-performance device, thus resulting in an increase in cost in view of the performance of the file system of the low-performance device.

In other words, a low-performance device having limited resources, such as a security memory storage device, cannot access data stored therein without the help of a host device. As a result, it is difficult to implement a low-performance device having a plurality of certificates without using a method of performing queries regarding certificates using an external device.

Accordingly, a method of managing a plurality of certificates issued by a plurality of certificate authorities even in a low-performance device is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of efficiently managing a plurality of certificates issued by a plurality of certificate authorities in a low-performance device, and a low-performance device for performing the method.

According to an aspect of the present invention, there is provided an apparatus for managing a plurality of certificates, the apparatus including a plurality of certificates; a certificate search table including information about the plurality of certificates; a low-performance file system for extracting a corresponding certificate from among the plurality of certificates that are received from a host device, with reference to the certificate search table based on a root certificate authority identification (ID) and information about a public key of a certificate of a certificate authority that issued the host device certificate; and a verification module which uses the extracted certificate to verify the host device certificate.

According to another aspect of the present invention, there is provided a method of managing a plurality of certificates, the method including receiving information a host device certificate, a root certificate authority ID, and information about a public key of a certificate of a certificate authority that issued the host device certificate from the host device; extracting a corresponding certificate from among a plurality of certificates with reference to a certificate search table including information about the plurality of certificates based on the received root certificate authority ID and the received information about the public key; and using the extracted certificate to verify the host device certificate.

According to another aspect of the present invention, there is provided an apparatus managing a plurality of certificates, the apparatus including a plurality of certificates; a certificate search table including information about the plurality of certificates; a low-performance file system extracting a low-performance device certificate with reference to the certificate search table based on information about a root certificate authority ID received from a host device; and a verification module transmitting the extracted low-performance device certificate to the host device.

According to another aspect of the present invention, there is provided an apparatus for managing a plurality of certificates, the apparatus including a plurality of certificates; a certificate search table including information about the plurality of certificates; a low-performance file system extracting a corresponding certificate from among the plurality of certificates with reference to the certificate search table based on information about a public key of a certificate that is received from a host device; and a verification module using the extracted certificate to verify the host device certificate.

According to another aspect of the present invention, there is provided a method of managing a plurality of certificates, the method including receiving information about a root certificate authority ID from a host device; extracting a low-performance device certificate with reference to a certificate search table including information about a plurality of certificates based on the received information about the root certificate authority ID; and transmitting the extracted low-performance device certificate to the host device.

According to another aspect of the present invention, there is provided a method of managing a plurality of certificates, the method including receiving information about a root certificate authority ID from a host device; extracting a low-performance device certificate with reference to a certificate search table including information about a plurality of certificates based on the received information about the root certificate authority ID; and using the extracted low-performance device certificate to verify other certificates.

According to another aspect of the present invention, there is provided a method of managing a plurality of certificates, the method including transferring information about a root certificate authority ID from a host device to a low-performance device; extracting a low-performance device certificate based on the information about the root certificate authority ID; transferring the extracted low-performance device certificate to a host device; and verifying the low-performance device certificate.

According to another aspect of the present invention, there is provided a method of managing a plurality of certificates, the method including receiving a host device certificate and information about a public key of a certificate of a certificate authority that issued the host device certificate from the host device; extracting a corresponding certificate from among a plurality of certificates with reference to a certificate search table including information about the plurality of certificates based on the received public key information; and using the extracted certificate to verify the host device certificate.

BRIEF DESCRIPTION OF THE DRAWINGS

The above and other aspects of the present invention will be more clearly understood from the following detailed description of exemplary embodiments taken in conjunction with the accompanying drawings, in which:

FIG. 5 is a view illustrating the structure of a certificate search table according to an exemplary embodiment of the present invention;

DESCRIPTION OF THE EXEMPLARY EMBODIMENTS

Figure 1:
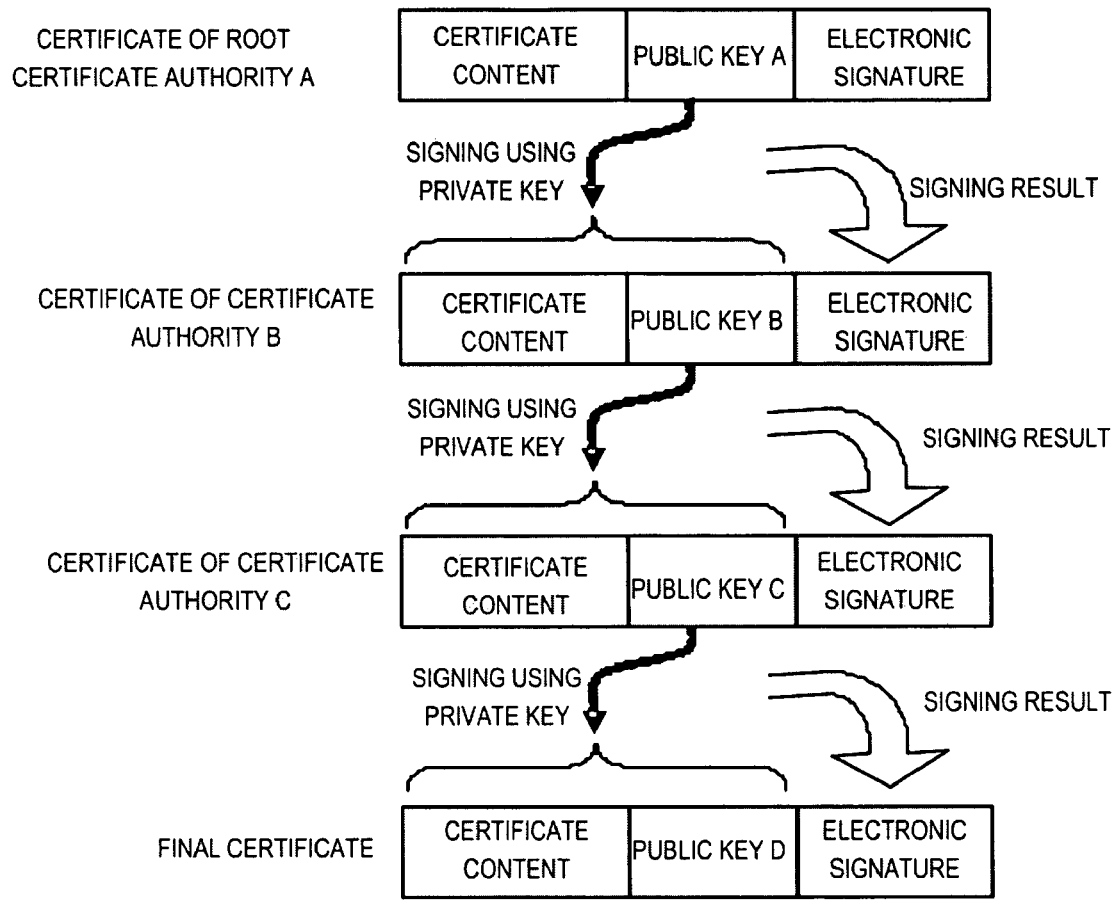
FIG. 1 is a diagram illustrating a related art certificate path.
Figure 2:
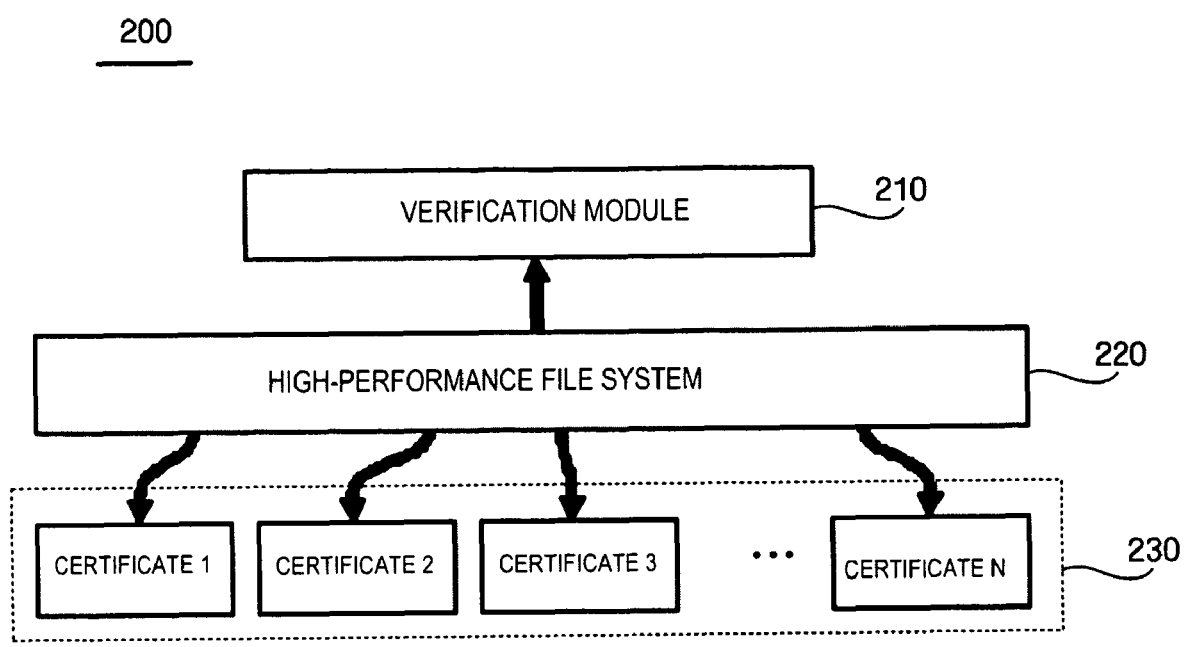
FIG. 2 is a block diagram illustrating the construction of a related art apparatus for performing verification.

Merits and characteristics of the invention, and methods for accomplishing them will become more apparent from the following embodiments taken in conjunction with the accompanying drawings. However, the present invention is not limited to the disclosed embodiments, but may be implemented in various manners. The embodiments are provided to complete the disclosure of the present invention and to allow those having ordinary skill in the art to understand the scope of the present invention. The present invention is defined by the category of the claims.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

Additionally, the computer program instructions may be stored in a computer usable or computer-readable memory that can direct a computer or other programmable data processing apparatus to function in a particular manner, such that the instructions stored in the computer usable or computer-readable memory produce an article of manufacture, including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions executed on the computer or other programmable apparatus provide steps for implementing the functions specified in the flowchart block or blocks.

Each block of the flowchart illustrations may also represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The terms necessary to describe the present invention are first defined as follows.

(1) Certificate

The certificate is also called an authorized certificate. It is used to verify identity at the time of an electronic information transaction and to prevent forgery, the alteration of documents and the repudiation of transactions.

(2) Certificate Authority

The certificate authority is an authority that has trustworthiness, which enables the fair management and guarantee of electronic information transactions, as well as personnel, technology and funds that enable the secure construction and management of a verification system.

(3) Root Certificate Authority

The root certificate authority is the topmost certificate authority on a certificate path.

(4) Certificate Authority (CA) Certificate

The CA certificate is the certificate of a certificate authority on a certificate path.

(5) Root Certificate Authority Certificate (Root CA Certificate)

The root CA certificate is the certificate of the root certificate authority, and is also a certificate that can be trusted without verification with reference to an upper certificate.

(6) Certificate Path

The certificate path is established by the connection between the certificates of certificate authorities. The certificate path uses the certificate of the root certificate authority as a trustworthiness starting point, and ends with the final certificate. An upper certificate authority on the certificate path issues the certificate of a lower certificate authority. The certificate path is established through such an issuance relationship.

(7) Upper Certificate Authority

This refers to a certificate authority that is relatively close to the root certificate authority on the certificate path.

(8) Lower Certificate Authority

The lower certificate authority is a certificate authority that is relatively far from the root certificate authority on the certificate path.

(9) Final Certificate

The final certificate is a certificate that is located at the final location of the certificate path.

(10) Signature

The signature is also referred as an electronic signature. The signature serves to verify the identity of a signer using a computer and to guarantee that the information content has not been forged or altered during the transmission and reception of the information.

(11) Public Key

The public key is used to encrypt information and verify an electronic signature in a Public Key Infrastructure (PKI), and is paired with a private key.

(12) Private Key

The private key is used to decrypt information and write an electronic signature in a PKI, and is paired with a public key.

(13) "||"

The symbol || indicates that two pieces of information are connected to each other.

(14) Cryptographic Hash

The cryptographic hash is used to convert information A into a hash value B having a specific length. In this case, it is impossible to extract the information A from the hash value B alone. Furthermore, it is impossible to obtain another value C, which is different from the information A and can be converted into the same hash value B, from the information A and the hash value B alone. Examples thereof are SHA1 and MD5.

(15) Cryptographic Hash Using Hash Key

The cryptographic hash using a hash key uses a key when hashing information. An entity not having the key cannot predict the hashed value even if it has the original information. Examples thereof are HMAC-SHA1 and HMAC-MD5.

Figure 4:
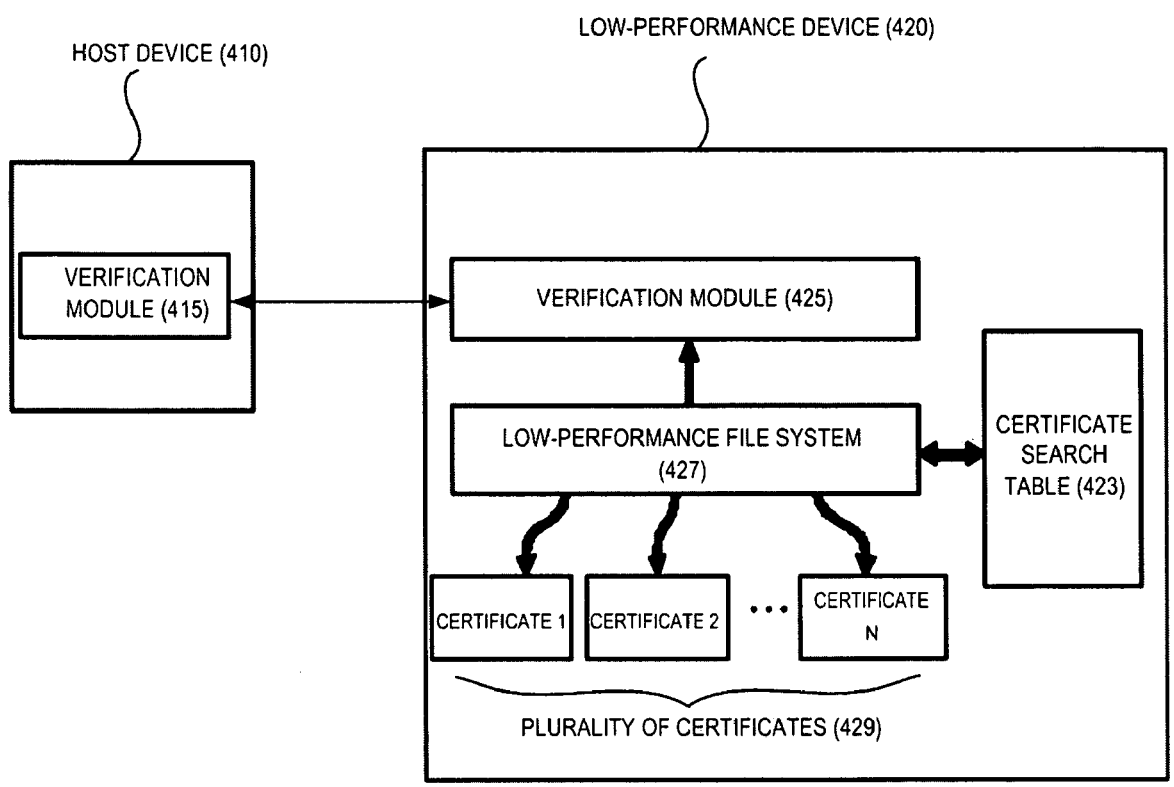
FIG. 4 is a block diagram showing the construction of a system according to an exemplary embodiment of the present invention.

FIG. 4 is a block diagram showing the construction of a system 400 according to an exemplary embodiment of the present invention.

Referring to FIG. 4, the system 400 according to the exemplary embodiment of the present invention includes a host device 410 and a low-performance device 420, and provides a system that can search for a plurality of certificates, issued by a plurality of certificate authorities, in the low-performance device 420.

In this case, the host device 410 includes a verification module 415. The low-performance device 420 includes a verification module 425, a low-performance file system 427, a plurality of certificates 429, and a certificate search table 423.

The term "module," as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays and variables. The functionality provided for in the components and modules may be combined into fewer components and modules or further separated into additional components and modules.

Figure 3:
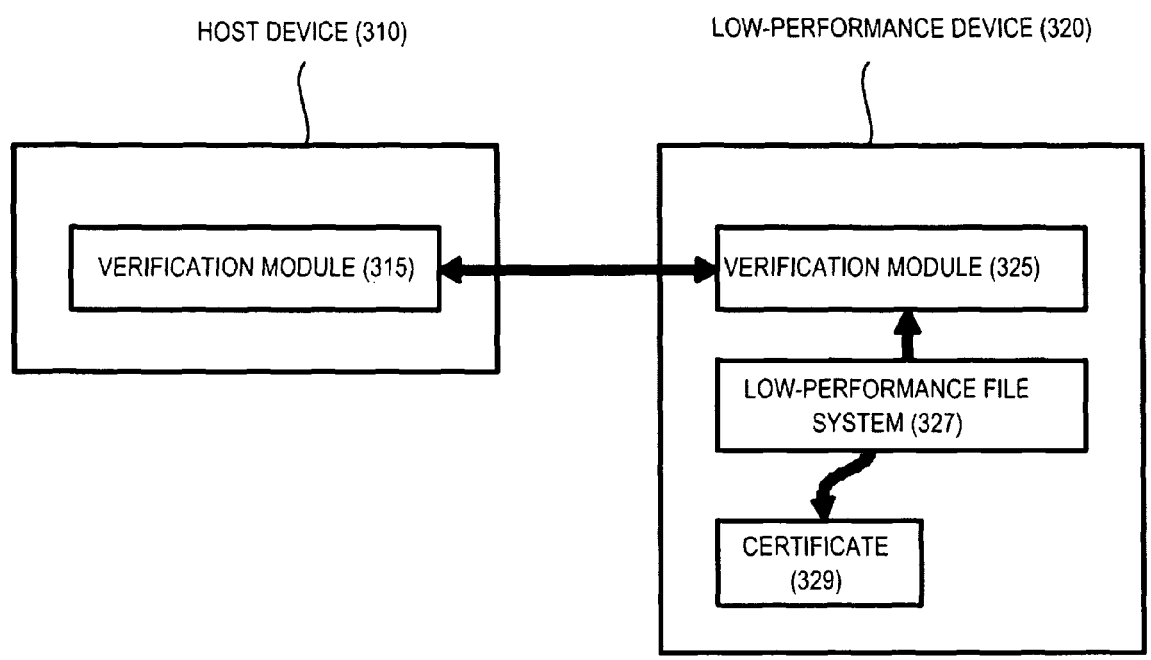
FIG. 3 is a block diagram showing the construction of a low-performance device for performing verification.

Referring to FIG. 4, the host device 410 and the verification module 415 correspond to the host device 310 and verification module 315 of FIG. 3, respectively.

Furthermore, the verification module 425 and low-performance file system 427 of the low-performance device 420 correspond to the verification module 325 and low-performance file system 327 of the low-performance device 320 of FIG. 3, respectively. Accordingly, the verification module 425 of the low-performance device 420 transfers a request from the verification module 415 of the host device 410 to the low-performance file system 427.

The low-performance file system 427 according to one example of the present invention selects a certificate from among the plurality of certificates 429 based on information corresponding to a certificate type, a certificate authority ID, and the hash of a certificate public key included in the certificate search table 423, and transfers the selected certificate to the verification module 425. In this case, a plurality of certificates 429 may be stored in the storage area (not shown) of the low-performance device 420. The low-performance file system 427 can obtain the location and length of a corresponding certificate in the storage area from the certificate search table 423, and extract a corresponding certificate from the storage area.

The location and length information of a certificate provides information about the storage location (for example, an address) and data length of the corresponding certificate that is stored in the storage area (not shown) of the low-performance device 420.

FIG. 5 illustrates the certificate search table 423 used to search for a plurality of certificates in the low-performance device 420.

Referring to FIG. 5, the certificate search table 423 includes fields having information about certificate types, root certificate authority IDs, the hashes of public keys, and the locations and lengths of certificates.

The certificate type information indicates the location of a corresponding certificate on a certificate path. For example, the certificate type information indicates whether a certificate is the certificate of the root certificate authority or the final certificate on the certificate path.

The root certificate authority ID information indicates the identity of the root certificate authority for the certificate.

Furthermore, the authorized certificate (based on an asymmetrical key signature method) generally has a public key. The hash information of the public key indicates the cryptographic hash value of a public key included in a certificate.

Figure 6:
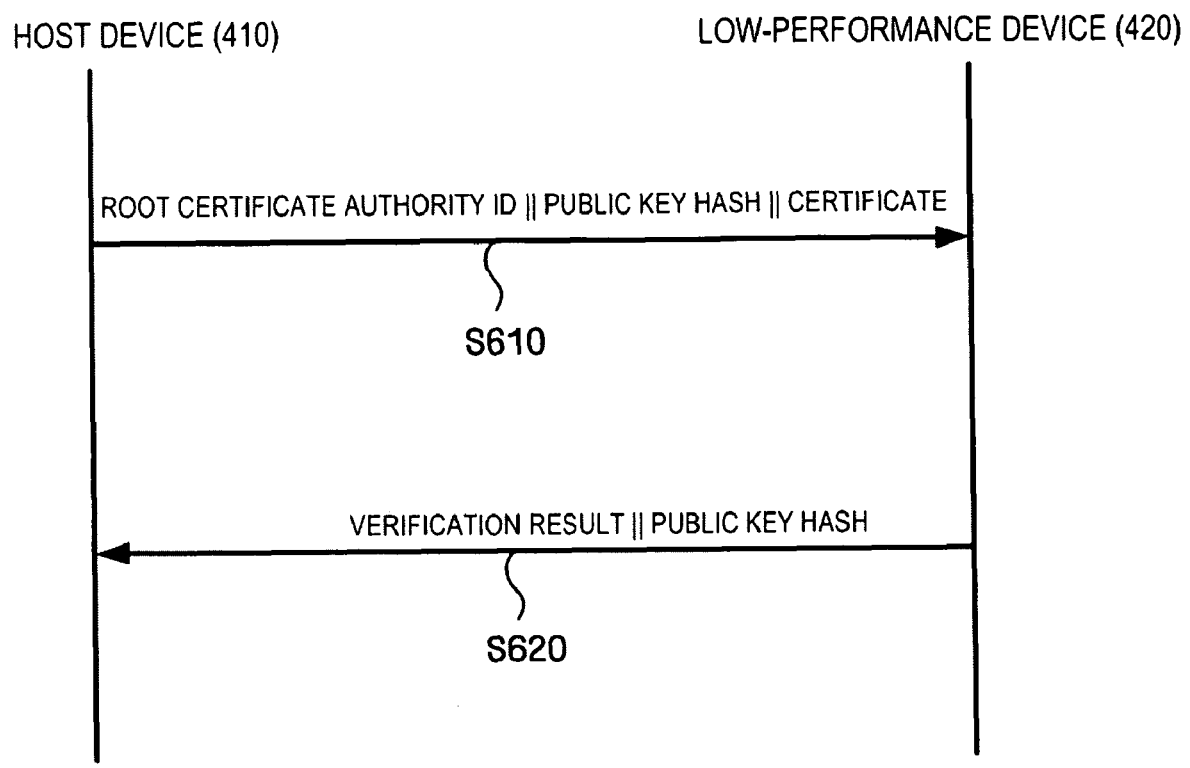
FIG. 6 is a view illustrating a method of transferring the certificate of a host device and a method of transferring other certificates of the host device on the certificate path according to an exemplary embodiment of the present invention.

FIG. 6 is a view illustrating a method of transferring the certificate of the host device 410 and a method of transferring other certificates of the host device 410 on the certificate path according to an embodiment of the present invention.

Referring to FIG. 6, the host device 410 transfers to the low-performance device 420 the root certificate authority ID and a value which is obtained by cryptographically hashing the public key of the certificate of the certificate authority that issued the certificate of the host device 410, along with the certificate of the host device 410 (which is considered as the final certificate on the certificate path) at operation S610.

The low-performance device 420 may then verify the host device certificate and transfer the results of the verification to the host device 410. In the case where the low-performance device 420 cannot verify the certificate because the certificate is omitted from the certificate path, for example, the low-performance device 420 may request the host device 410 to transfer the certificate necessary for the verification. In this case, the low-performance device 420 may transfer the public key hash of the desired certificate to the host device 410, along with the results of the verification. Thereafter, the host device 410 transfers the requested certificate to the low-performance device 420 in operation S620.

Figure 7:
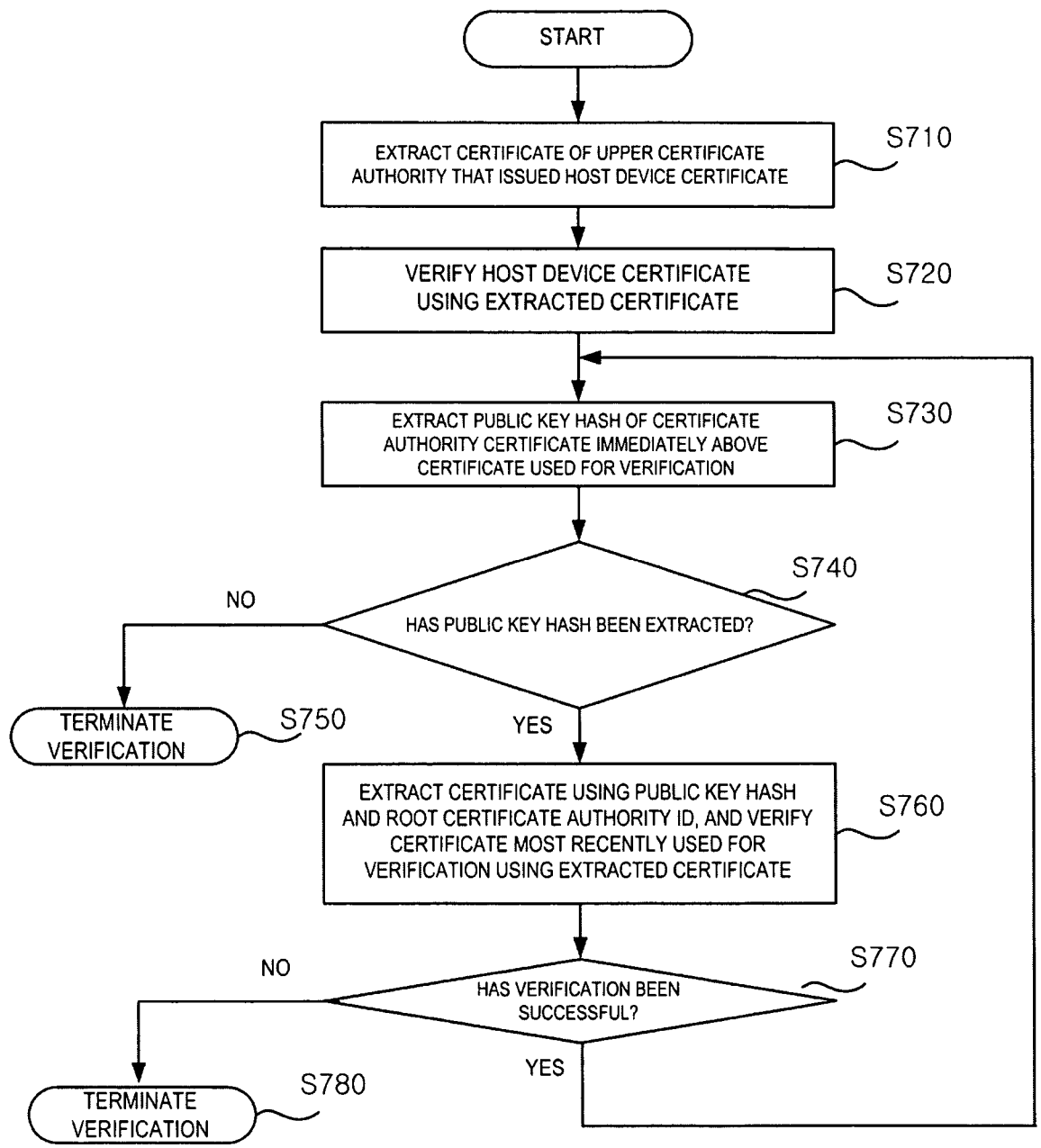
FIG. 7 is a flowchart illustrating a process of verifying the certificate of a host device according to an exemplary embodiment of the present invention.

FIG. 7 is a flowchart illustrating a process of verifying the certificate of the host device according to an embodiment of the present invention. In more detail, the flowchart shows a process performed by the low-performance device 420 after receiving the certificate of the host device 410, including searching for certificates on the certificate path using the certificate search table 423 and verifying the received certificate, using the method described above with reference to FIG. 6.

If the host device 410 transfers its certificate, a public key hash, and a root certificate authority ID to the low-performance device 420 as shown in FIG. 6, the low-performance device 420 extracts the certificate of the upper certificate authority, which issued the certificate of the host device, from the certificate search table 423 using the public key hash and the root certificate authority ID at operation S710. The public key hash refers to the public key hash value of the certificate of the certificate authority that issued the host device certificate.

Thereafter, the low-performance device 420 verifies the host device certificate using the extracted certificate of the upper certificate authority at operation S720, and extracts the public key hash of the certificate of the upper certificate authority that is located immediately above the certificate used for the verification at operation S730. According to X.509, an authorized certificate standard, the above-described extraction can be performed because every certificate includes the public key hash value of its upper certificate. If the public key hash has not been extracted at operation S740, it means that the certificate most recently used for the verification is the certificate of the root certificate authority. Accordingly, the host device certificate is determined to be valid and the verification process is then terminated at operation S750.

If the public key hash has been extracted at operation S740, a certificate is extracted from the certificate search table 423 using the public key hash and the root certificate authority ID and the certificate most recently used for the verification is verified using the extracted certificate at operation S760.

If the certificate fails to be verified at operation S770, the host device certificate is determined not to be valid and the verification process is terminated at operation S780. Additionally, if the host device certificate fails to be verified, the low-performance device 420 may reject the processing of data received from the host device 410.

Furthermore, if the verification of the certificate has been successful at operation S770, the process returns to operation S730.

If a certificate of a certificate authority that is not possessed by the low-performance device 420 is found during the verification of the certificate path, a corresponding certificate may be received from the host device 410. For this purpose, the low-performance device 420 may transfer the public key hash value of the required certificate to be received to the host device 410.

Figure 8:
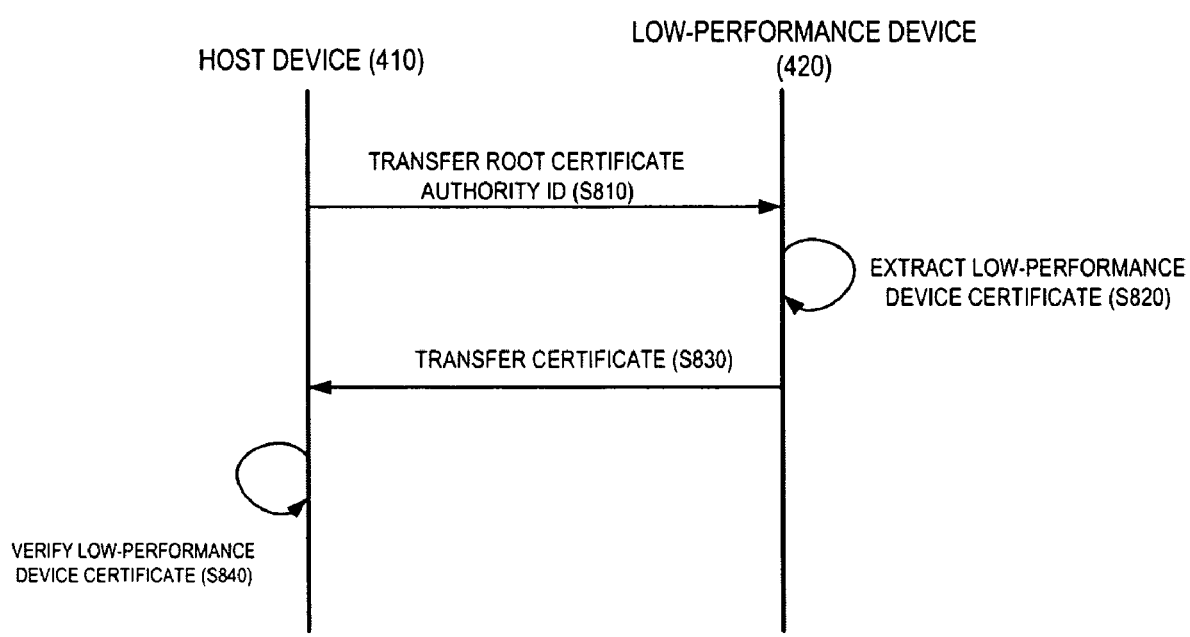
FIG. 8 is a view illustrating a method of verifying the certificate of the low-performance device according to an exemplary embodiment of the present invention.

FIG. 8 is an example of a method for verifying the certificate of the low-performance device according to an embodiment of the present invention. In more detail, the drawing shows a process in which the host device 410 verifies the certificate of the low-performance device 420 after the process shown in FIG. 7 has been terminated.

When the host device 410 transfers the root certificate authority ID of a certificate to be verified to the low-performance device 420 at operation S810, the low-performance device 420 extracts the certificate of the low-performance device 420 from the certificate search table 423 using the received root certificate authority ID at operation S820. Because the process described in reference to FIG. 7 has been completed, there is no public key hash and the final certificate is read.

Thereafter, the low-performance device 420 transfers the extracted low-performance device certificate back to the host device 410 at operation S830.

The host device 410 finds the certificate of the certificate authority that issued the certificate received from the low-performance device 420, and attempts to verify the certificate. If the host device 410 does not find the certificate of the certificate authority that issued the certificate received from the low-performance device 420, the host device 410 may transfer the public key hash of the desired certificate and a root certificate authority ID to the low-performance device 420, which may then find the corresponding certificate and transfer the requested certificate to the host device 410.

The host device 410 then verifies the certificate using the certificate that was found in itself or received from the low-performance device 420. The same process as in operation S840 is repeated until the certificate of the root certificate authority is used for verification at operation S840. That is, the certificate may be used to verify several certificates.

According to the present invention, there is an advantage in that a plurality of certificates issued by a plurality of certificate authorities can be managed and verified using only a low-performance file system in a low-performance device.

Furthermore, when the low-performance device according to the present invention stores certificates for one or more root certificate authorities, there is an advantage in that respective certificates can be efficiently managed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for managing a plurality of certificates, the apparatus comprising:
    a plurality of certificates issued by a plurality of certificate authorities;
    a certificate search table including certificate authority identifications (IDs), encryptions of public keys of the plurality of certificates, and memory addresses of locations of the plurality of certificates;
    a low-performance file system, dependent on control of a host device, which extracts a certificate of a certificate authority that issued a host device certificate from the plurality of certificates that are received from the host device, by retrieving a memory address of the certificate from the certificate search table, based on a root certificate authority ID and an encryption of a public key of the certificate of the certificate authority that issued the host device certificate;
    a verification module which verifies the host device certificate using the extracted certificate; and
    a storage which stores the plurality of certificates at corresponding memory addresses,
    wherein the low-performance file system directly accesses the corresponding memory address of the certificate of the certificate authority that issued the host device certificate, and extracts the certificate of the certificate authority that issued the host device certificate from the accessed memory address.

2. The apparatus of claim 1, wherein the certificate search table further includes certificate types and data lengths of the certificates.

3. The apparatus of claim 1, wherein the encryption of the public key of the certificate is a cryptographic hash of the public key of the certificate of the certificate authority that issued the host device certificate.

4. An apparatus for managing a plurality of certificates, the apparatus comprising:
    a plurality of certificates issued by a plurality of certificate authorities;
    a certificate search table including encryptions of public keys and memory addresses of locations of the plurality of certificates;
    a low-performance file system, dependent on control of a host device, which extracts a certificate from the plurality of certificates by retrieving a memory address of the certificate from the certificate search table based on an encryption of a public key in a host device certificate that is received from the host device;

a verification module that verifies the host device certificate using the extracted certificate; and a storage which stores the plurality of certificates at corresponding memory addresses, wherein the low-performance file system directly accesses the corresponding memory address of the certificate and extracts the certificate from the accessed memory address.

5. A method of managing a plurality of certificates, comprising:

receiving, at a low-performance device, dependent on control of a host device, a host device certificate, a root certificate authority identification (ID), and an encryption of a public key of a certificate of a certificate authority that issued the host device certificate, from the host device;

storing the plurality of certificates at corresponding memory addresses, retrieving a memory address of a certificate from a certificate search table, which stores certificate authority IDs, encryptions of public keys of the plurality of certificates, and memory addresses of locations of the plurality of certificates, based on the received root certificate authority ID and the received encryption of the public key;

extracting the certificate from the plurality of certificates issued by a plurality of certificate authorities based on the retrieved memory address; and verifying the host device certificate using the extracted certificate, wherein the low-performance file system directly accesses the corresponding memory address of the certificate and extracts the certificate from the accessed memory address.

6. The method of claim 5, wherein the certificate search table includes certificate types and data lengths of the certificates.

7. The method of claim 5, wherein the encryption of the public key is a cryptographic hash of the public key of the certificate of the certificate authority that issued the host device certificate.

8. A method of managing a plurality of certificates, the method comprising:

receiving, at a low-performance device, dependent on control of a host device, a host device certificate and an encryption of a public key of a certificate of a certificate authority that issued the host device certificate, from the host device;

storing the plurality of certificates at corresponding memory addresses, retrieving a memory address of at certificate from a certificate search table, which stores encryptions of public keys and memory addresses of locations of the plurality of certificates, based on the received encryption of the public key;

extracting the certificate from the plurality of certificates, issued by a plurality of certificate authorities, based on the retrieved memory address; and verifying the host device certificate using the extracted certificate, wherein the low-performance file system directly accesses the corresponding memory address of the certificate and extracts the certificate from the accessed memory address.

9. An apparatus for managing a plurality of certificates, the apparatus comprising:

a plurality of certificates issued by a plurality of certificate authorities;

a certificate search table including certificate authority identifications (IDs) and memory addresses of locations of the plurality of certificates;

a low-performance file system, dependent on control of a host device, which extracts a low-performance device certificate by retrieving a memory address of the low-performance device certificate from the certificate search table, based on a root certificate authority ID received from the host device;

a verification module which transmits the extracted low-performance device certificate to the host device; and a storage which stores the plurality of certificates at corresponding memory addresses, wherein the low-performance file system directly accesses the corresponding memory address of the low-performance device certificate and extracts the low-performance device certificate from the accessed memory address.

10. The apparatus of claim 9, wherein:

if an encryption of a public key and the root certificate authority ID are received from the host device, the low-performance file system extracts a corresponding certificate with reference to the certificate search table based on the received encryption of the public key and the received root certificate authority ID, and the verification module transfers the extracted certificate to the host device.

11. The apparatus of claim 9, wherein the certificate search table includes certificate types, encryptions of the public keys of the certificates, and data lengths of the certificates.

12. A method of managing a plurality of certificates, the method comprising:

receiving, at a low-performance device dependent on control of a host device, a root certificate authority identification (ID), from the host device;

storing the plurality of certificates at corresponding memory addresses, retrieving a memory address of a low-performance device certificate from a certificate search table including certificate authority IDs and memory addresses of locations of the plurality of certificates issued by a plurality of certificate authorities, based on the received root certificate authority ID, by the low-performance device;

extracting the low-performance device certificate from the plurality of certificates, based on the retrieved memory address, by the low-performance device;

transmitting the extracted low-performance device certificate from the low-performance device to the host device; and verifying the transmitted low-performance device certificate by the host device, wherein the low-performance file system directly accesses the corresponding memory address of the low-performance device certificate and extracts the low-performance device certificate from the accessed memory address.

13. The method of claim 12, further comprising, if an encryption of a public key and the root certificate authority ID are received from the host device, extracting a corresponding certificate with reference to the certificate search table based on the received encryption of the public key and the received root certificate authority ID, and transferring the extracted certificate to the host device.

14. The method of claim 12, wherein the certificate search table includes certificate types, encryptions of public keys of the certificates, and data lengths of the certificates.

15. A method of managing a plurality of certificates, the method comprising:

receiving, at a low-performance device dependent on control of a host device, a root certificate authority identification (ID), from the host device;

storing the plurality of certificates at corresponding memory addresses, retrieving a memory address of a low-performance device certificate from a certificate search table including certificate authority IDs and memory addresses of locations of the plurality of certificates issued by a plurality of certificate authorities, based on the received root certificate authority ID, by the low-performance device;

extracting the low-performance device certificate from the plurality of certificates based on the retrieved memory address, by the low-performance device; and verifying other certificates using the extracted low-performance device certificate, by the host device, wherein the low-performance file system directly accesses the corresponding memory address of the low-performance device certificate and extracts the low-performance device certificate from the accessed memory address.

16. A method of managing a plurality of certificates, the method comprising:

transferring a root certificate authority identification (ID) from a host device to a low-performance device, dependent on control of the host device;

storing the plurality of certificates at corresponding memory addresses;

retrieving a memory address of a low-performance device certificate from a certificate search table, which stores certificate authority IDs and memory addresses of locations of the plurality of certificates, based on the received root certificate authority ID, by the low-performance device;

extracting the low-performance device certificate from the plurality of certificates based on the retrieved memory address, by the low-performance device;

transferring the extracted low-performance device certificate from the low-performance device to the host device; and verifying the low-performance device certificate by the host device, wherein the low-performance file system directly accesses the corresponding memory address of the low-performance device certificate and extracts the low-performance device certificate from the accessed memory address.

* * * * *